(12) United States Patent
Kim

(10) Patent No.: US 11,967,476 B2
(45) Date of Patent: Apr. 23, 2024

(54) BYPASS SWITCH FOR STATCOM AND HVDC

(71) Applicant: HYOSUNG HEAVY INDUSTRIES CORPORATION, Seoul (KR)

(72) Inventor: Yong Soo Kim, Anyang-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 227 days.

(21) Appl. No.: 17/623,161

(22) PCT Filed: Mar. 3, 2021

(86) PCT No.: PCT/KR2021/002626
§ 371 (c)(1),
(2) Date: Dec. 27, 2021

(87) PCT Pub. No.: WO2021/182791
PCT Pub. Date: Sep. 16, 2021

(65) Prior Publication Data
US 2022/0246368 A1 Aug. 4, 2022

(30) Foreign Application Priority Data

Mar. 12, 2020 (KR) .................. 10-2020-0030725

(51) Int. Cl.
*H01H 3/32* (2006.01)
*H01H 1/36* (2006.01)

(52) U.S. Cl.
CPC ............. *H01H 3/32* (2013.01); *H01H 1/36* (2013.01)

(58) Field of Classification Search
CPC ............ H02M 1/32; H02M 1/36; H02M 7/48; H02M 7/483; H02M 7/4835; G01R 31/26; G01R 31/2607; G01R 31/40; H01H 15/00; H01H 15/02; H01H 15/06; H01H 15/08; H01H 15/10; H01H 15/16; H01H 15/24; H01H 33/04; H01H 33/42; H01H 2001/12; H01H 2001/22; H01H 2001/24; H01H 2001/36; H01H 2001/42; H01H 2009/0061; H01H 3/00; H01H 3/02; H01H 3/32; H01H 3/38; H01H 3/46; H01H 1/12; H01H 1/20;
(Continued)

(56) References Cited

FOREIGN PATENT DOCUMENTS

| CN | 103503106 A | * 1/2014 | .............. H01H 3/32 |
| JP | 2015-176835 A | 10/2015 | |

(Continued)

*Primary Examiner* — Anthony R Jimenez
(74) *Attorney, Agent, or Firm* — NKL LAW; Jae Youn Kim

(57) ABSTRACT

Techniques are described for a bypass switch that includes: a switch body having a column; a switch head which is coupled to the column and in which a sliding part is provided; a sliding part which is inserted into the switch head; a driven latch which is inserted into the sliding part and fixed to a driving shaft penetrating therethrough; a driving latch which is coupled to an end of the driving shaft exposed to an outside of the switch head, and which is provided to be driven by a solenoid; a stop coupled to the front of the switch head; a pressure bearing which is inserted into a lower portion of the sliding part and coupled thereto by a bearing pin; an elastic body provided between the sliding part and the switch body; and a rod coupled to an upper portion of the sliding part.

8 Claims, 6 Drawing Sheets

(58) Field of Classification Search
CPC .......... H01H 1/22; H01H 1/24; H01H 1/2008;
H01H 1/36; H01H 1/365; H01H 1/56
USPC ........................................................ 200/318
See application file for complete search history.

(56) References Cited

FOREIGN PATENT DOCUMENTS

| | | | |
|---|---|---|---|
| JP | 5791847 B1 | 10/2015 | |
| KR | 10-1125147 B1 | 3/2012 | |
| KR | 10-2015-0078416 A | 7/2015 | |
| KR | 10-2018-0121078 A | 11/2018 | |
| WO | WO-2015098142 A1 * | 7/2015 | ........... H01H 3/3031 |

* cited by examiner

BYPASS SWITCH FOR STATCOM AND HVDC

TECHNICAL FIELD

The present invention relates to a bypass switch for a static synchronous compensator (STATCOM) and a high voltage direct current (HVDC), and more particularly, to a bypass switch for a STATCOM and an HVDC in which rapid closing is possible using a spring and a solenoid.

BACKGROUND ART

In general, a high voltage direct current (HVDC) system uses a power transmission method in which a power transmission station converts alternating current (AC) power produced in a power plant into direct current (DC) power to transmit the DC power, and then, a power receiving station reconverts the DC power into AC power to supply the AC power. A static synchronous compensator (STATCOM) is a facility that minimizes power lost and increases voltage stability when electricity is transmitted and distributed.

The HVDC system is applied to undersea cable power transmission, large capacitor long-distance power transmission, interconnection between AC grids, and the like. In addition, the HVDC system enables interconnection in grids having different frequencies and asynchronism interconnection. Here, the power transmission station converts AC power into DC power. That is, since it is expensive to transmit AC power using an undersea cable or the like, the power transmission station converts the AC power into the DC power to transmit the DC power to the power receiving station.

Meanwhile, when an abnormality such as a failure of sub-modules is detected in a system including a combination of a plurality of sub-modules, a high-speed short-circuit bypass switch in such a system short-circuits sub-modules detected to be abnormal, thereby preventing the effect of the failure from being propagated to other adjacent sub-modules. Since the high-speed short-circuit bypass switch should finish its operation in a short time, the high-speed short-circuit bypass switch should have a structure which may be operated in a short time.

In a switch disclosed in U.S. Pat. No. 8,390,968, in order to operate the switch, a current is allowed to flow in a coil installed in a driving direction to generate an electromagnetic force, thereby driving the switch. However, there are problems in that a size of the coil may be increased in such a structure to increase a size of the switch and the switch may not be operated at a high speed.

In addition, Japanese Patent Laid-Open No. Hei 11-45641 discloses a circuit breaker including an operating rod provided on the same scale at an end of a circuit breaker vacuum valve in a tripping direction of a traveling contact, a closing spring which applies a force to the operating rod in a closing direction of the traveling contact, a trip part which applies a force to the operating rod in the tripping direction of the traveling contact against the closing spring upon tripping, a roller rotatably supported by the operating rod, and two stoppers which are provided to be movable in a direction perpendicular to an axis of the roller upon tripping, operate in opposite directions, block a movement path of the moving roller together with the operating rod, and interrupt the roller to maintain a trip state, wherein, by releasing the engagement of the stopper with the roller, the closing spring moves the operating rod and performs closing. However, even in this case, there are also the same problems in that a size may be increased, and the circuit breaker may not be operated for a short time.

DISCLOSURE

Technical Problem

The present invention is directed to providing a bypass switch, which is a bypass switch for a static synchronous compensator (STATCOM) and a high voltage direct current (HVDC), in which, when an abnormality such as a failure of sub-modules is detected, sub-modules detected to be abnormal are rapidly short-circuited using a spring and a solenoid to prevent the effect of the failure from being propagated to other adjacent sub-modules, thereby obtaining operation reliability.

The present invention is also directed to providing a bypass switch in which, when an abnormality such as a failure of sub-modules is detected, rapid closing can be possible using a spring and a solenoid, a size can be reduced as much as possible, costs can be reduced, and manufacturing convenience can also be secured.

Technical Solution

According to one embodiment of the present invention, a bypass switch for a static synchronous compensator (STATCOM) and a high voltage direct current (HVDC) includes a switch body including a column, a switch head coupled to the column and provided with a sliding part which is vertically slidable, the sliding part inserted into the switch head, a driven latch inserted into the sliding part and fixed to a driving shaft passing therethrough, a driving latch coupled to an end portion of the driving shaft exposed to the outside of the switch head and provided to be driven by a solenoid, a stopper coupled to a front side of the switch head to restrict movement of the driven latch, a pressure bearing inserted into a lower portion of the sliding part and coupled thereto through a bearing pin, an elastic body provided between the sliding part and the switch body, and a rod coupled to an upper portion of the sliding part so as to be insulated therefrom by an insulator.

In the switch body, an elastic body seating groove may be formed around a first through-hole, a lower portion of the column may be provided at a rear side of the switch body, and a first female screw portion may be provided at an upper end portion of the column.

The switch head may be coupled to the column through a bolt and may include head arms, which each have a support bearing insertion hole into which a support bearing is inserted, provided to extend from both front sides of a head fixing part having a stepped hole.

In the head arms, a second female screw portion may be provided close to the support bearing insertion hole formed in any one head arm so that a driving shaft separation prevention piece is bolt-coupled thereto, and third female screw portions may be provided at upper and lower sides of an end portion of the any one head arm so that the stopper is coupled thereto.

In the sliding part, vertical long holes may be formed to face each other at an upper side of a sliding piece having a channel shape with an open lower portion, pinholes may be formed to face each other so as to be spaced a predetermined distance downward from the vertical long holes, and a spring pressure piece including a rod may be provided under the sliding piece having the pinholes.

In the driven latch, a driven latch piece may be provided to extend downward from a lower portion of a driven latch body having a second through-hole, and a first fixing pinhole may be formed in a center of the driven latch body in a direction perpendicular to the driven latch piece so that the driven latch is coupled to the driving shaft through a fixing pin.

In the driving latch, a driving latch piece may be provided to extend downward from a lower part of a driving latch body having a third through-hole, and a second fixing pinhole may be formed in a center of the driving latch body in a direction perpendicular to the driving latch piece so that the driving latch is coupled to the end portion of the driving shaft through a fixing pin. The driving latch may be provided such that one side of a coil spring is caught by the driving latch piece and the other side of the coil spring is caught by a latch bolt provided in the switch head.

In the stopper, a stopper fixing piece, which forms a right angle with the head arm and has a bolt through-hole, may be provided to be bent from an end of a stopper coupling piece which is parallel to the head arm of the switch head and is coupled thereto through a bolt, and a gap adjustment bolt may be coupled to the bolt through-hole.

The pressure bearing may be provided to have a form of a bushing without a ball, and a spacer ring may be fitted on an end portion of the bearing pin so that the bearing pin is coupled thereto through a split pin.

Advantageous Effects

In a bypass switch for a static synchronous compensator (STATCOM) and a high voltage direct current (HVDC) according to the present invention, when an abnormality such as a failure of sub-modules is detected, sub-modules detected to be abnormal are rapidly short-circuited using a spring and a solenoid to prevent the effect of the failure from being propagated to other adjacent sub-modules, thereby obtaining operation reliability.

In addition, according to the present invention, there can be provided a bypass switch in which, when an abnormality such as a failure of sub-modules is detected, rapid closing can be possible using a spring and a solenoid, a size can be reduced as much as possible, costs can be reduced, and manufacturing convenience can also be secured.

MODES OF THE INVENTION

Figure 1:
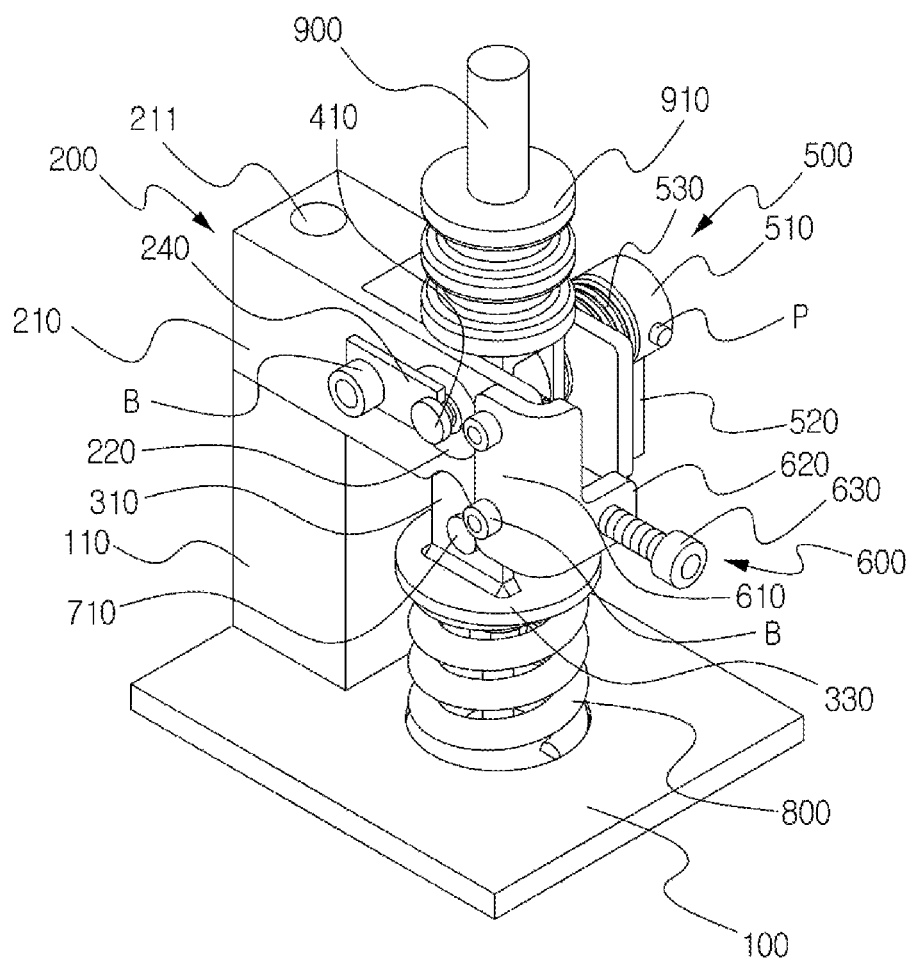
FIG. 1 is a perspective view illustrating a bypass switch for a static synchronous compensator (STATCOM) and a high voltage direct current (HVDC) according to the present invention.

Detailed embodiments for implementing the present invention will be described with reference to the accompanying drawings.

The present invention may be modified in various ways and implemented by various embodiments so that specific embodiments are illustrated in the drawings and will be described in detail below. However, it is to be understood that the present invention is not limited to the specific embodiments but includes all modifications, equivalents, and substitutions included in the spirit and the scope of the present invention.

Hereinafter, a bypass switch for a static synchronous compensator (STATCOM) and a high voltage direct current (HVDC) according to the present invention will be described with reference to the accompanying drawings.

Figure 2:
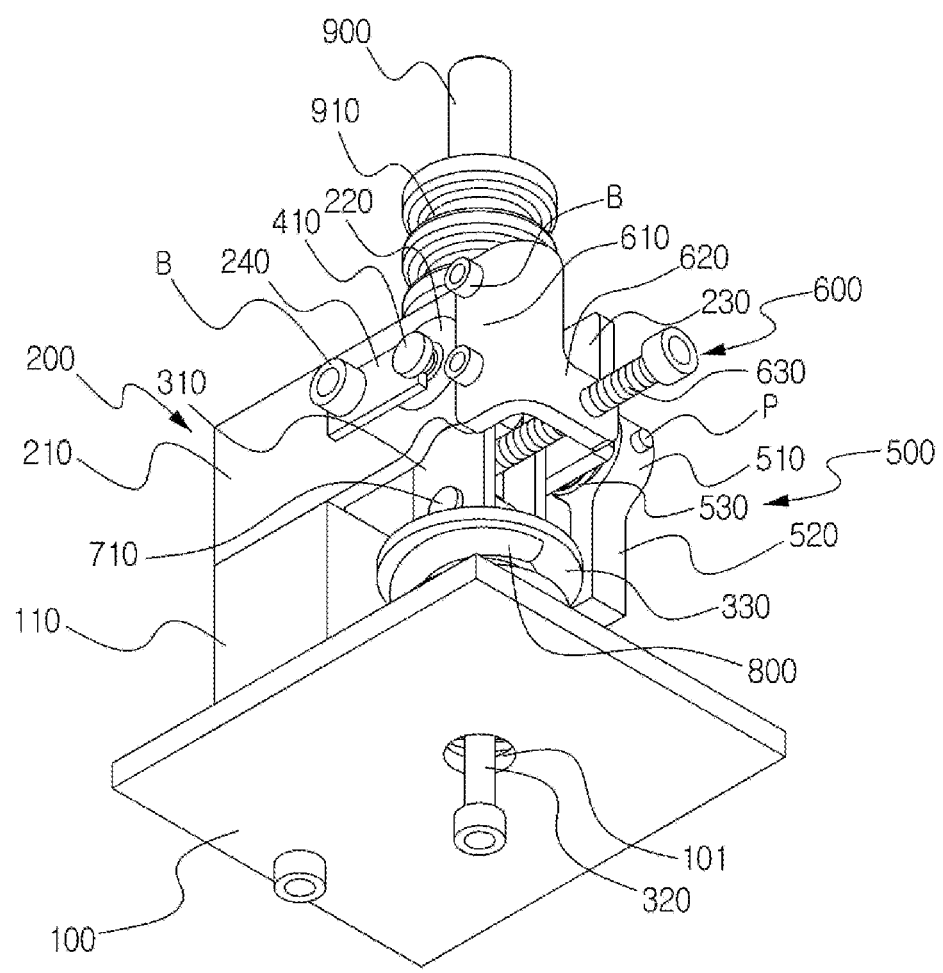
FIG. 2 is a perspective view illustrating the bypass switch for a STATCOM and an HVDC when viewed from below according to the present invention.
Figure 3:
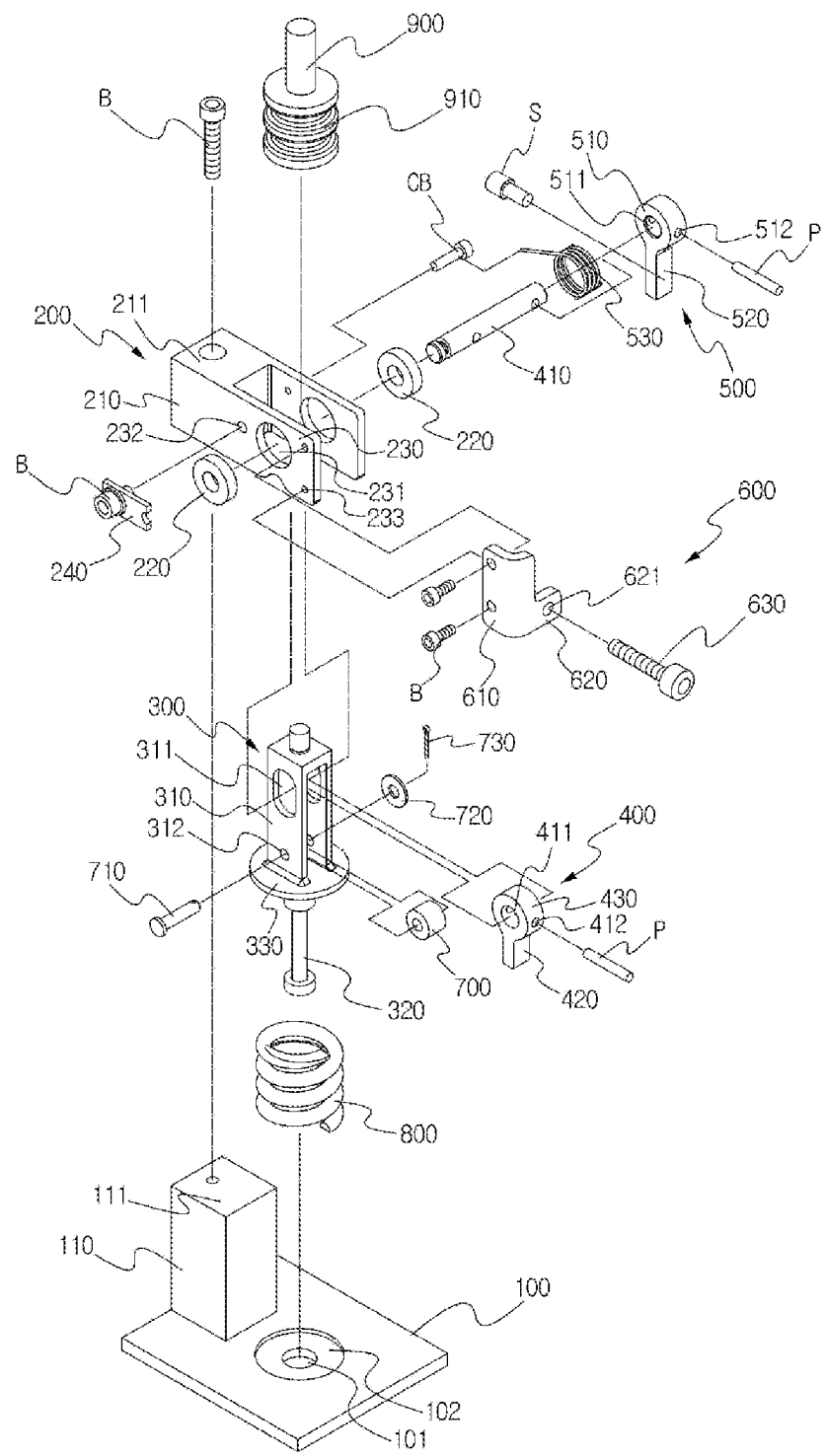
FIG. 3 is an exploded perspective view illustrating the bypass switch for a STATCOM and an HVDC according to the present invention.
Figure 4:
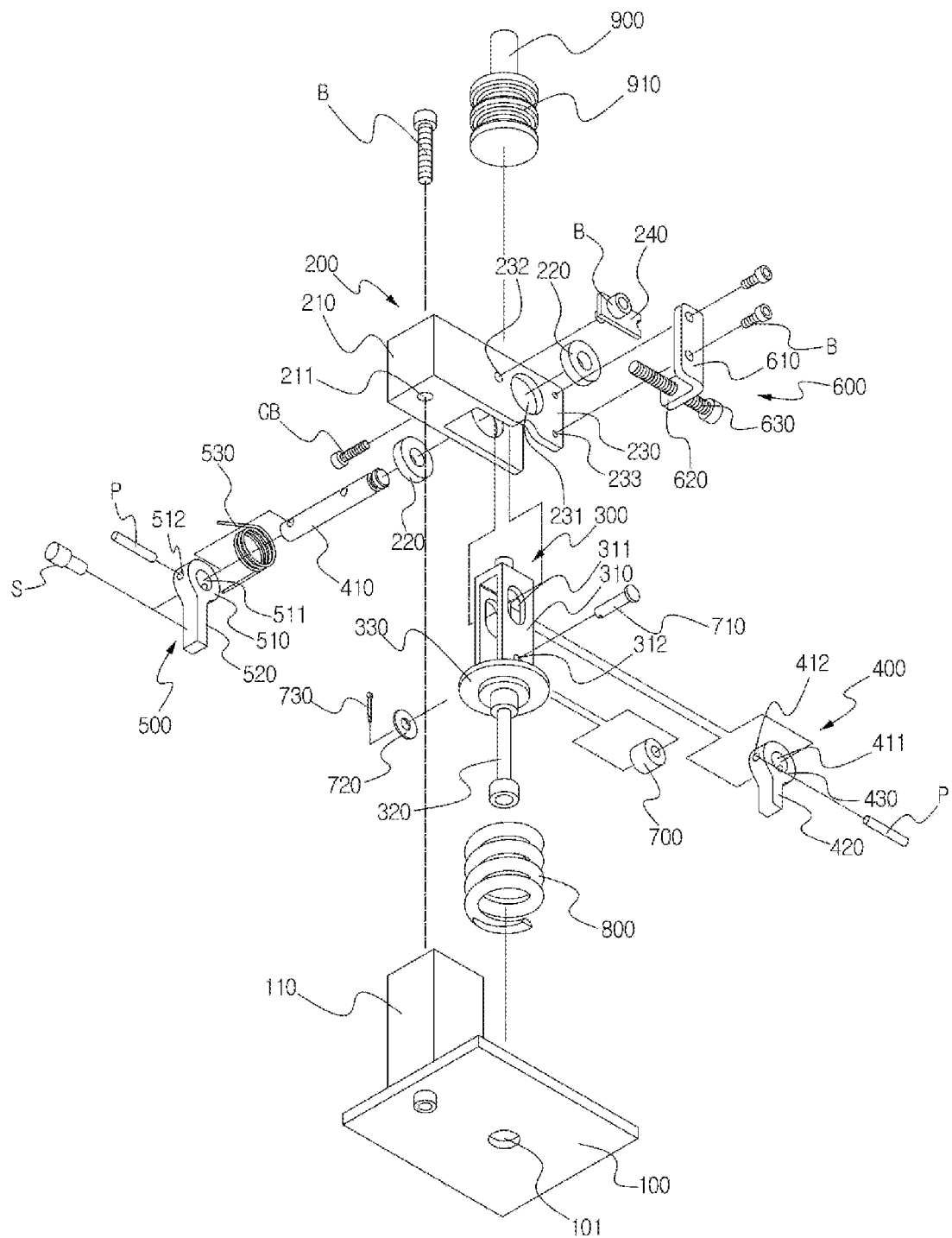
FIG. 4 is an exploded perspective view illustrating the bypass switch for a STATCOM and an HVDC when viewed from below according to the present invention.
Figure 5:
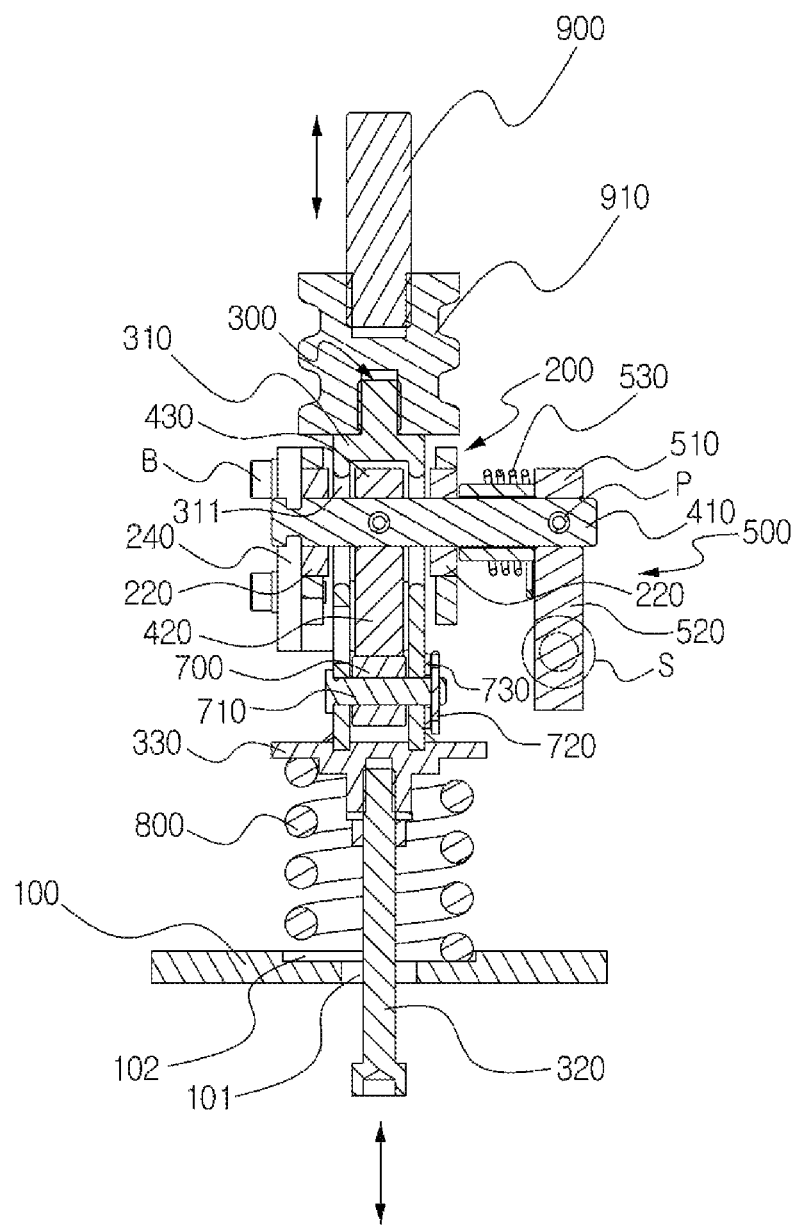
FIG. 5 is a longitudinal cross-sectional view illustrating the bypass switch for a STATCOM and an HVDC according to the present invention.
Figure 6:
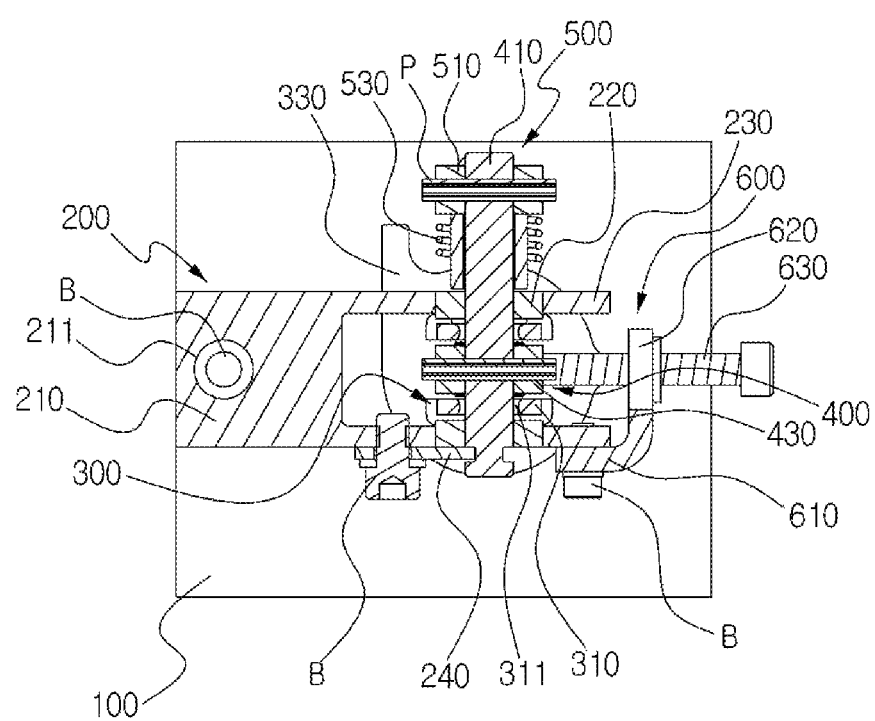
FIG. 6 is a transverse cross-sectional view illustrating the bypass switch for a STATCOM and an HVDC according to the present invention.

FIG. 1 is a perspective view illustrating a bypass switch for a STATCOM and an HVDC according to the present invention, and FIG. 2 is a perspective view illustrating the bypass switch for a STATCOM and an HVDC when viewed from below according to the present invention. In addition, FIG. 3 is an exploded perspective view illustrating the bypass switch for a STATCOM and an HVDC according to the present invention, and FIG. 4 is an exploded perspective view illustrating the bypass switch for a STATCOM and an HVDC when viewed from below according to the present invention. Meanwhile, FIG. 5 is a longitudinal cross-sectional view illustrating the bypass switch for a STATCOM and an HVDC according to the present invention, and FIG. 6 is a transverse cross-sectional view illustrating the bypass switch for a STATCOM and an HVDC according to the present invention.

As shown in FIGS. 1 to 6, the bypass switch for a STATCOM and an HVDC according to the present invention includes a switch body 100, a switch head 200, a sliding part 300, a driven latch 400, a driving latch 500, a stopper 600, a pressure bearing 700, an elastic body 800, and a rod 900.

Here, the switch body 100 has the form of a quadrangular panel and includes a column 110 erected vertically at a rear side of an upper portion thereof so that the switch head 200 may be provided to maintain a parallel state while being spaced apart from an upper surface of the switch body 100 by a certain interval.

An elastic body seating groove 102 having a predetermined diameter and depth is formed around a first through-hole 101 formed in a central portion of the switch body 100 so that a lower portion of the elastic body 800 having the form of a coil spring may be provided to be stably supported. In addition, a lower portion of the column 110 is provided to have an upright shape at a rear side of the switch body 100, and a first female screw portion 111 is provided at an upper end portion of the column 110 so that a lower portion of a head fixing part 210 of the switch head 200 may be provided to be coupled thereto through a bolt B in a seated state.

The switch head 200 is coupled to the column 110 such that the sliding part 300 is vertically slidable, and one side thereof is coupled to the column 110 through the bolt B.

The switch head 200 is provided with the head fixing part 210 having a stepped hole 211 in which the bolt B is inserted and caught, and a head arm 230, which has a support bearing insertion hole 231 into which a support bearing 220 is inserted, is provided to extend from each of both front sides of the head fixing part 210.

A second female screw portion 232 is provided close to the support bearing insertion hole 231 formed in any one head arm 230 of two head arms 230 provided to be parallel to each other, and thus, a driving shaft separation prevention piece 240 is coupled thereto through the bolt B, thereby preventing a driving shaft 410 from falling out in a reverse direction. In addition, third female screw portions 233 are provided at upper and lower sides of an end portion of any one head arm 230 so that the stopper 600 is coupled thereto to limit movement or rotation of the driven latch 400.

The sliding part 300 may be inserted into the switch head 200 and rapidly reciprocated up and down by an elastic force of the elastic body 800 and rotation of the driving shaft 410 caused by a solenoid S. That is, vertical long holes 311 may be formed to face each other at an upper side of a sliding piece 310 having a channel shape with an open lower portion, and thus, the sliding part 300 may be guided by the driving shaft 410 and slidably reciprocated up and down. Pinholes 312 are formed to face each other so as to be spaced a predetermined distance downward from the vertical long holes 311 so that the pressure bearing 700 is provided to be coupled thereto through a bearing pin 710.

In addition, a spring pressure piece 330 including a rod 320 is provided under the sliding piece 310 having the pinholes 312 so that an elastic force of a spring, which is the elastic body 800, may be accurately transmitted.

The driven latch 400 is inserted into the sliding part 300 and is fixed to the driving shaft 410 passing therethrough. Thus, the driven latch 400 may be provided to be interlocked with the driving shaft 410. In addition, a driven latch piece 420 is provided to extend downward from a lower portion of a driven latch body 430 having a second through-hole 411, and an end of the driven latch piece 420 is in contact with a surface of the pressure bearing 700 positioned to face upward. Thus, a state in which the sliding part 300 is moved downward by a length of the driven latch piece 420 may be maintained.

To this end, a first fixing pinhole 412 is formed in a center of the driven latch body 430 in a direction perpendicular to the driven latch piece 420, and thus, the driven latch 400 is coupled to the driving shaft 410 through a fixing pin P. Accordingly, without loss due to slipping, driving of the driving shaft 410 may act without any changes.

The driving latch 500 is coupled to an end portion of the driving shaft 410 exposed to the outside of the switch head 200 and is provided to be driven by the solenoid S. That is, a driving latch piece 520 is provided to extend downward from a lower part of a driving latch body 510 having a third through-hole 511, and a second fixing pinhole 512 is formed in a center of the driving latch body 510 in a direction perpendicular to the driving latch piece 520. Thus, the driving latch 500 may be coupled to the end portion of the driving shaft 410 through a fixing pin P so that the driving shaft 410 may be accurately driven.

To this end, one side of a coil spring 530 is caught by the driving latch piece 520, and the other side of the coil spring 530 is provided to be caught by a latch bolt CB provided in the switch head 200. Accordingly, the driving latch 500 may be maintained at a predetermined position by an elastic force of the coil spring 530.

The stopper 600 is coupled to a front side of the switch head 200 to restrict movement of the driven latch 400. A stopper fixing piece 620 maintained at a right angle with the head arm 230 is provided to be bent from an end of a stopper coupling piece 610 which is parallel to the head arm 230 of the switch head 200 and is coupled thereto through the bolt B.

A bolt through-hole is formed in the stopper fixing piece 620, and a gap adjustment bolt 630 is coupled thereto. Thus, the gap adjustment bolt 630 may be adjusted to restrict a movement amount of the driven latch 400.

The pressure bearing 700 is inserted into a lower portion of the sliding part 300 to be coupled thereto through a bearing pin 710 and is provided in the form of a bushing without a ball. A spacer ring 720 is fitted on an end portion of the bearing pin 710 so that the bearing pin 710 is coupled thereto through a split pin 730. Accordingly, the bearing pin 710 may be prevented from falling out in a reverse direction.

The elastic body 800 may be provided to have the form of a coil spring and may be provided between the sliding part 300 and the switch body 100 to always provide an elastic force to the lower portion of the sliding part 300.

The rod 900 may be provided on the sliding part 300, and a vacuum interrupter including a fixed contactor and a movable contactor (not shown) may be driven by the insulator 910.

As described above, according to a bypass switch for a STATCOM and an HVDC of the present invention, when an abnormality such as a failure of sub-modules is detected, sub-modules detected to be abnormal can be rapidly short-circuited using a spring and a solenoid to prevent the effect of the failure from being propagated to other adjacent sub-modules, thereby obtaining operation reliability. In addition, when an abnormality such as a failure of sub-modules is detected, rapid closing is possible using a spring and a solenoid, a size can be reduced as much as possible, costs can be reduced, and manufacturing convenience can also be secured.

While the present invention has been described with reference to embodiments shown in the drawings, this is merely an example, and the present invention is not limited to the described embodiments and the drawings. Instead, it will be appreciated by those skilled in the art that various modifications may be made to these embodiments without departing from the principles and spirit of the present invention. Therefore, the true scope of the present invention should be determined by the technical idea of the appended claims.

| * Descriptions of Reference Numerals * |
| --- |
| 100: switch body |
| 110: column |
| 200: switch head |
| 300: sliding part |
| 400: driven latch |
| 410: driving shaft |
| 500: driving latch |
| 600: stopper |
| 700: pressure bearing |
| 710: bearing pin |
| 800: elastic body |
| 900: rod |

INDUSTRIAL APPLICABILITY

The present invention relates to a bypass switch for a static synchronous compensator (STATCOM) and a high voltage direct current (HVDC) and is applicable in STATCOM or HVDC fields.

The invention claimed is:

1. A bypass switch for a static synchronous compensator (STATCOM) and a high voltage direct current (HVDC), comprising:

a switch body including a column;

a switch head coupled to the column and provided with a sliding part which is vertically slidable;

the sliding part inserted into the switch head;

a driven latch inserted into the sliding part and fixed to a driving shaft passing therethrough;

a driving latch coupled to an end portion of the driving shaft exposed to an outside of the switch head and provided to be driven by a solenoid;

a stopper coupled to a front side of the switch head to restrict a movement of the driven latch;

a pressure bearing inserted into a lower portion of the sliding part and coupled thereto through a bearing pin;

an elastic body provided between the sliding part and the switch body; and a rod coupled to an upper portion of the sliding part so as to be insulated therefrom by an insulator.

2. The bypass switch of claim 1, wherein, in the switch body, an elastic body seating groove is formed around a first through-hole, a lower portion of the column is provided at a rear side of the switch body, and a first female screw portion is provided at an upper end portion of the column.

3. The bypass switch of claim 1, wherein, in the sliding part, vertical long holes are formed to face each other at an upper side of a sliding piece having a channel shape with an open lower portion, pinholes are formed to face each other so as to be spaced a predetermined distance downward from the vertical long holes, and a spring pressure piece including a rod is provided under the sliding piece having the pinholes.

4. The bypass switch of claim 1, wherein, in the driven latch, a driven latch piece is provided to extend downward from a lower portion of a driven latch body having a second through-hole, and a first fixing pinhole is formed in a center of the driven latch body in a direction perpendicular to the driven latch piece so that the driven latch is coupled to the driving shaft through a fixing pin.

5. The bypass switch of claim 1, wherein: in the driving latch, a driving latch piece is provided to extend downward from a lower part of a driving latch body having a third through-hole, and a second fixing pinhole is formed in a center of the driving latch body in a direction perpendicular to the driving latch piece so that the driving latch is coupled to the end portion of the driving shaft through a fixing pin; and the driving latch is provided such that one side of a coil spring is caught by the driving latch piece and another side of the coil spring is caught by a latch bolt provided in the switch head.

6. The bypass switch of claim 1, wherein, in the stopper, a stopper fixing piece, which forms a right angle with head arms of the switch head and has a bolt through-hole, is provided to be bent from an end of a stopper coupling piece which is parallel to the head arms of the switch head and is coupled thereto through a bolt, and a gap adjustment bolt is coupled to the bolt through-hole.

7. The bypass switch of claim 1, wherein the switch head is coupled to the column through a bolt and includes head arms, which each have a support bearing insertion hole into which a support bearing is inserted, provided to extend from both front sides of a head fixing part having a stepped hole.

8. The bypass switch of claim 7, wherein, in the head arms, a second female screw portion is provided close to the support bearing insertion hole formed in one of the head arms so that a driving shaft separation prevention piece is bolt-coupled thereto, and third female screw portions are provided at upper and lower sides of an end portion of the one head arm so that the stopper is coupled thereto.

* * * * *